United States Patent [19]

Kita et al.

[11] 4,324,713

[45] Apr. 13, 1982

[54] TWO-PACKAGE SOLVENTLESS RUST PREVENTIVE MATERIAL

[75] Inventors: Ryuji Kita, Yokohama; Hisataka Komai, Kamakura; Makoto Wakabayashi, Koshigaya; Haruyoshi Takagishi, Yamato, all of Japan

[73] Assignees: Nippon Zeon Co. Ltd., Tokyo; Nisson Motor Co. Ltd., Kanagawa, both of Japan

[21] Appl. No.: 118,321

[22] Filed: Feb. 4, 1980

[30] Foreign Application Priority Data

Feb. 9, 1979 [JP] Japan ............................. 54-14538
Nov. 14, 1979 [JP] Japan ............................ 54-148017

[51] Int. Cl.³ .......................................... C08G 63/00
[52] U.S. Cl. ................................. 523/457; 525/113; 528/92; 528/93; 528/113; 528/341; 523/458; 523/459; 523/468; 523/456
[58] Field of Search ............. 260/37 EP, 30.4 EP, 260/31.8 E, 33.4 EP, 33.6 EP; 528/92, 93, 113, 341; 252/511, 513; 525/113

[56] References Cited

U.S. PATENT DOCUMENTS

| | | | |
|---|---|---|---|
| 3,291,758 | 12/1966 | Treaftis | 252/512 |
| 3,412,043 | 11/1968 | Gilliland | 252/514 |
| 3,507,831 | 4/1970 | Avis et al. | 528/113 X |
| 3,519,604 | 7/1970 | Maurer | 260/47 |
| 3,998,779 | 12/1976 | Baer | 260/37 EP |
| 4,003,959 | 1/1977 | Wada et al. | 260/837 R |
| 4,012,458 | 3/1977 | Wada et al. | 260/837 R |

*Primary Examiner*—Earl A. Nielsen
*Attorney, Agent, or Firm*—Sherman & Shalloway

[57] ABSTRACT

A two-package solventless rust preventive material comprises (A) a sprayable component essentially containing a liquid epoxy resin and a liquid polycarboxylic acid anhydride and (B) a sprayable component essentially containing a liquid primary or secondary amino compound and a curing accelerator, at least one of said components (A) and (B) essentially comprising a non-reactive epoxy resin diluent having a molecular weight of 300 to 4,000 and an electrically conductive powder.

10 Claims, No Drawings

TWO-PACKAGE SOLVENTLESS RUST PREVENTIVE MATERIAL

This invention relates to a sprayable two-package solventless rust preventive material. More specifically, this invention relates to a rust preventive material comprising (A) a sprayable component essentially containing a liquid epoxy resin and a liquid polycarboxylic acid anhydride and (B) a sprayable component essentially containing a liquid primary or secondary amino compound and a curing accelerator, at least one of components (A) and (B) further containing essentially a nonreactive epoxy resin diluent and an electrically conductive powder.

In recent years, the corrosion resistance of automobiles has been rigorously required, and materials constituting various parts of an automobile and methods of assembling them have been re-assessed. Heretofore, the end-bended (hemmed) portions of hoods, doors, trunk lids, etc. (to be referred to as panels) have been bonded by spot welding or by coating a thermosetting adhesive in dots by means of a multiejector. However, when panels prepared by such a method are secured to the car body and subjected to primer coating, an electrodeposition paint does not easily go into the end-bended parts of the panels or into their vicinity, and therefore, these parts are not satisfactorily protected by a coating. Accordingly, there is a tendency that water gradually comes into the end-bended portions in service to cause corrosion. In order to prevent the penetration of water, an attempt has been made to coat a sealant such as a polyvinyl chloride resin paste in bead form on the end-bended portions of panels by means of an automatic flow gun. With this method, however, it is difficult to seal the bended portions fully with the sealant, and water may come from imperfectly sealed portions to cause rust. Accordingly, it cannot fully cope with rust formation.

The present inventors extensively investigated measures against rust formation on end-bended portions of panels. These investigations led to the discovery that an effect of preventing rust on the end-bended portions can be exhibited to a greater extent than conventional methods by coating a certain rust preventive material in a ribbon form on those parts of panels which are required to be end-bended and their vicinities, end-bending the coated panels, assembling them, and then coating the assembled panels, followed by baking. However, according to this method, the types of suitable rust preventive materials are extremely limited because the properties required of these materials are very much limited.

Specifically, rust preventive materials that can be applied to this method should meet the following requirements.

(1) For increased productivity, they should be able to be sprayed, especially by an airless coater, to provide a coated film in a ribbon form.

(2) They should be solventless to maintain industrial hygiene and safety.

(3) They should have early curability (shower resistance) at room temperature within a period of several hours so that the coatings may not be blown off when warm water or an alkaline degreasing liquid is applied thereto from a nozzle under pressure during the time from the end of spraying to the baking and curing of the coated film.

(4) They should have electric conductivity to such an extent that in electrodeposition coating, an insufficiently coated part does not occur around the spray applied.

In addition to the above basic properties, they should also meet the following requirements.

(5) They should not give off offensive odors at the time of coating.

(6) A sufficient curing reaction should take place in these materials during passage (a period of about 30 minutes) through an existing baking furnace (temperature 160° to 170° C.) in the automobile manufacturing process.

(7) In the cured state, they should have sufficient corrosion resistance and good adhesion to metal.

(8) They should have superior storage stability at room temperature.

Conventional rust preventive materials do not meet these requirements, and can scarcely be used with good results.

For example, a method comprising curing an epoxy resin with a primary or secondary amino compound alone has gained widespread commercial acceptance because the resin can be cured either at room temperature or under heat. Such an amino compound, however, generally has the defect of strong odor and toxicity. Amino compounds having a high boiling point obtained by modifying such an amino compound so as to reduce odor and toxicity have the defect that they generally are very much limited in utilization in highly viscous solventless materials, and because of the modifying procedure, their cost is high. These compounds further suffer from the defect that because the properties of the cured article are sensitive to variations in the ratio of the main ingredient to the curing agent, the method of using them is limited and it is difficult to use these compounds. When a compound having a phenolic hydroxyl group or a methylol group, such as a phenolic resin, a urea resin, or a melamine resin, is used, there can be obtained cured articles having superior chemical resistance, hardness, adhesion and abrasion resistance, but to induce a sufficient curing reaction, a temperature of, say, 185° to 210° and a period of about 20 to 30 minutes are required for curing. For this reason, the use of such a curing agent is likely to cause collapsing of panels, and is therefore not suitable for the automobile manufacturing process.

When a polycarboxylic acid anhydride is used as a curing agent for epoxy resins, the resulting cured article can withstand high temperatures and has superior mechanical and electrical properties, but reactivity at room temperature cannot be so much expected. Hence, lack of flexibility and poor adhesion in the cured articles cannot be avoided.

It is an object of this invention to provide a rust preventive material which meets the aforesaid properties and has superior flexibility or adhesion.

The present inventors have found that the object of this invention can be achieved by using a special blending recipe in a system comprising a mixture of a polycarboxylic acid anhydride and a primary or secondary amino compound as a curing agent for epoxy resins.

Thus, according to this invention there is provided a novel two-package solventless rust preventive material comprising (A) a sprayable component essentially containing a liquid epoxy resin and a liquid polycarboxylic acid anhydride and (B) a sprayable component essentially containing a liquid primary or secondary amino compound and a curing accelerator, at least one of the components (A) and (B) further essentially containing a non-reactive epoxy resin diluent having a molecular weight of 300 to 4,000 and an electrically conductive powder.

The epoxy resins used in this invention are polyepoxides which are liquid at room temperature and have at least 2 epoxy groups per molecule. Examples of suitable epoxy resins are epoxy resins obtained from bisphenol A or bisphenol F and epichlorohydrin, and epoxy resins obtained from hydrogenated bisphenol A and epichlorohydrin. Other useful polyepoxides include polyglycidyl ethers of novolack resins and similar polyphenol resins; polyglycidyl ethers of polyhydric alcohols such as ethylene glycol, propylene glycol, diethylene glycol and glycerol; glycidyl esters of carboxylic acids such as phthalic acid or hydrogenated phthalic acid; acrylic copolymers having an epoxy group; and epoxidized products of polybutadiene. Of these epoxy resins, those which have a viscosity of not more than 1,000 poises at room temperature are preferred. Those which are solid at room temperatures are not desirable because blended compositions are difficult to obtain without using a solvent.

The polycarboxylic acid anhydride (curing agent) used in this invention is liquid at room temperature, and those having a freezing point of not more than 0° C. are widely used. Examples of such a curing agent include hexahydrophthalic anhydride, methylhexahydrophthalic anhydride, tetrahydrophthalic anhydride, methyltetrahydrophthalic anhydride, methylendomethylene-tetrahydrophthalic anhydride, dodecenylsuccinic anhydride, and isomeric mixtures thereof. They are used either singly or as mixtures.

The primary or secondary amino compound used in this invention is liquid at room temperature, and may be any of aliphatic amino compounds, aromatic amino compounds, and modified products of these, which are usually employed as curing agents for epoxy resins. Examples of the aliphatic amino compounds include ethylenediamine, diethylenetriamine, triethylenetetramine, menthenediamine, meta-xylylenediamine, 3,9-bis(3-aminopropyl)-2,4,8,10-tetra-oxaspiro[5,5]-undecane, and bis(4-amino-3-methylcyclohexyl)methane. Amino groups containing a tertiary amino group together with a primary and a secondary amino group in one molecule, such as diethylaminopropylamine or N-aminoethylpiperazine, can also be used. Examples of the aromatic amino compounds include meta-phenylenediamine, diaminodiphenylmethane and diaminodiphenylsulfone. Examples of products obtained by modifying these amino compounds to control toxicity or pot life include adducts between these amino compounds and epoxy resins; adducts between the above amino compounds and alkylene oxides such as ethylene oxide or propylene oxide; polyamideamines, i.e. condensation products between carboxylic acids and amino compounds; cyanoethylated polyamines; and ketone-blocked polyamines. The polyamideamines are preferred from the standpoint of odor, toxicity, viscosity, shower resistance, etc.

The curing accelerator used in this invention may be any of those used conventionally for this purpose in a polycarboxylic acid anhydride curing agent system for epoxy resins. Specific examples include tertiary amino compounds such as dimethyl benzylamine, N,N-dimethylaniline, dimethylaminomethyl phenol, tris(dimethylaminomethyl)phenol, 2-ethyl-4-methylimidazole and 1-benzyl-2-methylimidazole, metal soaps such as tin octenate and zinc naphthenate, metal alcoholates such as sodium alcoholates, and metal complex salts such as tin acetylacetonate.

The diluent used in this invention is generally called a "non-reactive epoxy resin diluent having no epoxy group in the molecule". Examples of such diluents include phenol-modified aromatic polymers, phenol-modified coumarone resin, a condensation product of xylene and formaldehyde, oily substances resulting from the cracking of crude oils, and cyclopentadiene resins having copolymerized therewith a vinyl monomer containing a hydroxyl group or an ester group. These diluents should be miscible with epoxy resins and non-reactive with curing agents, and should have a number average molecular weight of 300 to 4,000. Those having a molecular weight of less than 300 are undesirable because they may reduce the mechanical strength of the resulting cured products, or may evaporate during spraying to cause fire or accidents. Those having a molecular weight of more than 4,000 are neither desirable because they result in a high viscosity of the composition and spraying of the composition is difficult.

In addition to the five ingredients described above, the rust preventive material of this invention should also contain an electrically conductive powder mainly for the purpose of ensuring close adhesion of an electrodeposition paint to the edge of the rust preventive material sprayed. Specific examples of such an electrically conductive powder are electrically conductive carbon blacks and graphite, and metal powders such as zinc, copper, silver and aluminum powders. Since, however, the use of metal powders tends to cause reduction of electric conductivity because of oxidation or impair the stability of the resulting blend, conductive carbon blacks and graphite free from this defect are preferred. Preferably, the conductive powder has a particle diameter of 0.1 to 40 microns. With increasing particle diameter, the resulting composition is more difficult to spray, and with decreasing particle diameter, the conductivity of the powder decreases and consequently, the corrosion resistance of the material is reduced.

In addition to the aforesaid essential ingredients, other compounding agents may be added to the rust preventive material of this invention, as required. Examples of such compounding agents are agents for improving adhesion of the rust preventive material to the surface of a cold-rolled steel plate having a rust preventive oil adhering thereto, a filler, an extender, a pigment, and a flame retardant. Specific examples include silicone-type surface-active agents, bitumen, glass fibers, quartz powder, calcium carbonate, talc, mica, colloidal silica, and asphalt.

The aforesaid ingredients are distributed between components (A) and (B) in this invention. Component (A) essentially contains the epoxy resin and the polycarboxylic acid anhydride and optionally contains the epoxy resin diluent and the conductive powder. Component (B) essentially contains the primary or secondary amino compound and the curing accelerator, and optionally contains the epoxy resin diluent and the conductive powder. It is necessary that the epoxy resin diluent and the conductive powder should be included in either one of the components (A) and (B). Inclusion of these optional components in both components (A) and (B) is desirable for the formation of a uniform coated film. When an extender, a filler, an adhesion improver, etc. are used, they may preferably be included in both of components (A) and (B).

The components (A) and (B) should be prepared in a viscosity of such an extent that they can be sprayed at room temperature, for example in a viscosity at 25° C. of 1 to 1,000 poises, preferably 10 to 500 poises.

The ratio between the epoxy resin and the polycarboxylic acid anhydride in component (A) may be chosen as desired. Usually, the ratio is such that 0.2 to 1.5 acid anhydride groups, preferably 0.3 to 1.2 acid anhydride groups, exist per epoxy group in the component (A). As the relative amount of the polycarboxylic acid anhydride decreases, the effect of using it in combination with the amine-type curing agent decreases. On the other hand, as it increases, the storage stability of the component (A) is reduced or the unreacted polycarboxylic acid anhydride remains in an excessive amount to reduce the rust preventive ability of the material of this invention.

The mixing ratio between the primary or secondary amino compound and the curing accelerator in component (B) may also be chosen as desired. Usually, the primary or secondary amino compound is used in such an amount that 0.1 to 2.5, preferably 0.3 to 2.0, active hydrogens of the amino group exist per epoxy group. The curing accelerator is used in an amount of 0.05 to 30 parts by weight, preferably 0.2 to 20 parts by weight, per 100 parts by weight of the epoxy resin. As the relative amount of the active hydrogen of the amino group decreases, the shower resistance and corrosion resistance of the resulting material are reduced. On the other hand, when it increases, the odor or toxicity, which is inherent to amine-type curing agents, cannot be ignored, and moreover, the adhesion and rust preventing ability of the resulting material tend to be reduced. Furthermore, as the relative amount of the curing accelerator decreases, the curing of the epoxy resin becomes insufficient, and the adhesion strength and rust preventive ability of the resulting material are reduced. As the amount of the curing accelerator increases, the flexibility of the cured product is reduced.

So long as the rust preventive material of this invention meets these requirements, there is no particular restriction on the proportions of the components (A) and (B). It is necessary, however, that when the components (A) and (B) are mixed, the resulting mixture should contain 10 to 250 parts by weight, preferably 15 to 200 parts by weight, of the epoxy resin diluent and 0.5 to 20 parts by weight, preferably 1 to 15 parts by weight, of the conductive powder. When the amount of the diluent is too small, the effect of improving the flexibility of the cured product is not sufficient. On the other hand, if it is too large, curing will be insufficient, and the hardness of the cured product will be reduced. When the amount of the conductive powder is too small, an electrodeposition paint does not adhere to the edge of the cured product during electrodeposition coating, and if it is too large, the viscosity of the composition increases and the composition is difficult to spray.

The mixing ratio between the components (A) and (B) in this invention is such that the resulting mixture contains 0.2 to 1.5 acid anhydride groups and 0.1 to 2.5 active hydrogens of the amino group per epoxy group, and the total number of the acid anhydride groups and active hydrogens of the amino group is at least 0.6, preferably at least 1.0. The present invention has the advantage that so long as this mixing ratio is maintained, the ratio between the main ingredient and the curing agent can be varied over a wide range.

In applying the rust preventive material of this invention, the components (A) and (B) may be mixed immediately before application. Alternatively, it is possible to obtain a cured product having equivalent properties to those obtained by prior mixing by spraying the two components onto an article independently from each other and mixing them on the article being coated.

The external mixing method which comprises spraying the two components separately from two guns and mixing them in the air or on an article being coated has the general defect that mixing of the two components is insufficient and a high level of shower resistance is difficult to obtain, and the mixing of the components on the article is insufficient to cause a loss of the components. The internal mixing method which comprises introducing two components into a single gun from separate hoses and mixing them therein has the advantage that the effect of pre-mixing is exhibited to a greater degree as the mixing is effected more fully. However, it has the defect that curing of the components may begin before they come out of the gun, or they may cure within the gun while it is not in operation, and moreover, the gun is difficult to cleanse because the components do not contain a solvent.

The present inventors made various investigations about the method of coating, and found that a special internal mixing method involving spraying the two components immediately upon mixing is most practical in order to stabilize a spray pattern, reduce a loss of the material, secure full mixing of the two components, and to remove line troubles such as clogging. According to this coating method, in order to prevent clogging, the distance from that part of the gun at which the two components get together to its tip at which the mixture is sprayed should be limited to about 5 cm at the longest, and usually to about 3 cm, and the mixing time should be limited to not more than 1 second. It is physically impossible, however, to provide a mixing tank in such a short course. Accordingly, any coating material for use in this method is required to give a desirable cured product on an article to be coated by mixing within such a short distance and mixing in the air.

To meet this requirement, it is necessary that each of the components (A) and (B) should have a thixotropy index, measured by using a rotary B-type viscometer (rotor No. 5), of at least 2.0. The "thixotropy index", as used herein, denotes the ratio of the viscosity at 10 revolutions to that at 50 revolutions when the viscosities are measured at 50° C. It is not clear why such a condition is required. But it is theorized that the viscosities of the components decrease owing to variations in shear force while they are passing from hoses to the nozzle and tip of the gun, and thus they become easy to mix.

This requirement for thixotropy index can be easily met by adding to the components (A) and (B) a suitable amount of an inorganic material such as carbon black, graphite, calcium carbonate, talc, mica and colloidal silica, or an organic compound such as hydrogenated castor oil, metal soaps (e.g., an aluminum, zinc or calcium salt of stearic acid) or organic bentonite. Instead of adding such a compound, this requirement can also be met by suitably selecting the types or amounts of the aforesaid electrically conductive materials, extenders, fillers, etc. For example, in order to obtain a thixotropy index of at least 2.0 by adding electrically conductive carbon black alone to a liquid epoxy resin, conductive carbon black having a particle diameter of about 10 microns must be added in an amount of at least 1 part by weight per 100 parts by weight of the liquid epoxy resin. But in the case of a liquid epoxy resin containing about 20 parts by weight of talc or mica, this requirement can be met even if the amount of the conductive carbon black is about 0.5 part by weight.

The rust preventive material of this invention described hereinabove has high safety because it is substantially of the solventless type. It also possesses very good shower resistance, flexibility and adhesion strength. Moreover, the odor and toxicity of the rust preventive material of this invention are within fully permissible ranges. Accordingly, the material of this invention is very suitable for rust prevention of automobile panels. Since the two components of this material are both airless-sprayable, they can be coated by the exterior mixing method. It is, however, suitable as a material for the instantaneous internal mixing method in which the time for pre-mixing is short. According to the latter coating method, a loss of the material on an article to be coated as small, and a high level of shower resistance can be obtained.

The following examples illustrate the present invention more specifically. All parts and percentages in these examples are by weight unless otherwise specified.

EXAMPLE 1

In each run, a thermosetting material composed of a component (A) and a component (B) was prepared by mixing an epoxy resin (a glycidyl ether of bisphenol A available under the tradename "Epikote 828" made by Shell Chemical Co.; epoxy equivalent 180, viscosity 13,000 cetipoises at 25° C.), an isomerized product of a mixture in equal proportions of 4-methyltetrahydrophthalic anhydride and 3-methyltetrahydrophthalic anhydride (freezing point below $-20°$ C.), polyamideamine ("Versamid 140", trademark for a product of Daiichi General Co., Ltd.; amine value 385, viscosity 350 centipoises at 75° C.), tin octenate, a non-reactive epoxy resin diluent ("Sintaron 702", trademark for a phenol-modified aromatic polymer made by Tokyo Resin Industry Co., Ltd.; viscosity 200 centipoises at 25° C., number average molecular weight 370), carbon black ("HS-600", a product of Asahi Carbon Co., Ltd.), talc, and a silicone oil ("SH-28PA", a trademark for a product of Toray Silicone Co., Ltd.) in accordance with the recipes shown in Table 1. The mixture was dispersed by a three-roll mill, and the particle diameters of the dispersed particles were observed by an electron microscope. These particles diameters were thus found to be 1 to 20 microns.

The viscosities of the resulting components (A) and (B) were measured at 25° C. by a B-type viscometer. Then, the components (A) and (B) were sprayed in a weight ratio of 1:1 onto a mild steel panel having an anti-rust oil adhering thereto by means of two airless spray devices (compression ratio 1:50 in both devices). The panel was allowed to stand at room temperature for 3 hours, and warm water at 50° C. was sprayed in atomized form under a pressure of 3 kg/cm$^2$ against the panel, and the shower resistance of the panel was observed. The panel was then dipped in an anionic electrodeposition paint containing a water-soluble salt of maleinized cis-1,4-polybutadiene and titanium white, carbon black and strontium chromate as pigments. An electric current was passed at 25° C. for 2 minutes at a voltage of 200 V. The coated panel was washed with water and heated at 160° C. for 30 minutes to cure the coating. The various properties of the coated steel panel were examined, and the results are shown in Table 1.

TABLE 1

| Run | Control 1-1 | Invention 1-2 | Invention 1-3 | Control 1-4 | Control 1-5 |
|---|---|---|---|---|---|
| Component (A) | | | | | |
| Epoxy resin | 100 | 100 | 100 | 100 | 100 |
| Methyltetrahydrophthalic anhydride | — | 50 | 60 | 50 | 50 |
| Diluent | 60 | 60 | 50 | 60 | 60 |
| Carbon black | 3 | 3 | 3 | 3 | 3 |
| Talc | 40 | 40 | 40 | 40 | 40 |
| Silicone oil | 1 | 1 | 1 | 1 | 1 |
| Component (B) | | | | | |
| Polyamideamine | 30 | 30 | 20 | — | 30 |
| Tin octenate | 1 | 1 | 1 | 1 | — |
| Diluent | 150 | 150 | 150 | 180 | 150 |
| Carbon black | 3 | 3 | 3 | 3 | 3 |
| Talc | 70 | 70 | 70 | 70 | 70 |
| Silicone oil | 1 | 1 | 1 | 1 | 1 |
| Viscosity (poises/25° C.) of the mixture | | | | | |
| Component (A) | 351 | 268 | 201 | 268 | 268 |
| Component (B) | 160 | 160 | 217 | 315 | 158 |
| Number of acid anhydride groups per epoxy group | 0 | 0.54 | 0.65 | 0.54 | 0.54 |
| Number of active hydrogens of the amino group per epoxy group | 0.86 | 0.86 | 0.59 | 0 | 0.86 |
| Properties | | | | | |
| Storage stability (viscosity variations within 30% on storage for 1 week at 60° C.) | | | | | |
| Component (A) | O | O | O | O | O |
| Component (B) | O | O | O | O | O |
| Shower resistance | Half was | Good | Good | Half was | Half was |

TABLE 1-continued

| Run | Control 1-1 | Invention 1-2 | Invention 1-3 | Control 1-4 | Control 1-5 |
|---|---|---|---|---|---|
| Thickness of cured film ($\mu$) | flowed away. 90 | 110 | 88 | flowed away. 103 | flowed away. 120 |
| Flexural resistance (10mm $\phi$) | O | O | O | O | O |
| Adhesion (crosscut, 100/100) | X | O | O | O | X |
| Impact strength ($\frac{1}{2}$" × 500 g × 20 cm) | O | O | O | O | X |
| Corrosion resistance (salt spray 1000 hrs) | Rust formed (*1) | O | O | Rust formed (*1) | Rust formed (*1) |

(*1): Dot-like rust is seen on the entire surface (the same evaluation will apply hereinafter).

It is seen from the results obtained that when methyltetrahydrophthalic anhydride is not used (Run No. 1—1), shower resistance and adhesion are poor; when polyamide amine is not used (Run No. 1-4), shower resistance is extremely poor and consequently the rust-preventive ability of the material decreases; and that when tin octenate is not used (Run No. 1-5), curing is insufficient, and mechanical strength and rust preventive ability are inferior.

EXAMPLE 2

Example 1 was repeated except that components (A) and (B) were prepared in accordance with the compounding recipes shown in Table 2. The results are shown in Table 2.

TABLE 2

| Run No. | Invention 2-1 | Invention 2-2 | Control 2-3 | Control 2-4 |
|---|---|---|---|---|
| Component (A) | | | | |
| Epoxy resin | 100 | 100 | 100 | 100 |
| Methyltetrahydrophthalic anhydride | 50 | 50 | 50 | 50 |
| Diluent | 100 | 60 | — | 60 |
| Carbon black | 3 | 5 | 3 | — |
| Talc | 60 | 40 | 40 | 40 |
| Silicone oil | 1 | 1 | 1 | 1 |
| Component (B) | | | | |
| Polyamideamine | 30 | 30 | 30 | 30 |
| Dimethylbenzylamine | 1 | 1 | 1 | 1 |
| Diluent | 190 | 150 | — | 150 |
| Carbon black | 3 | 5 | 3 | — |
| Talc | 90 | 70 | 70 | 70 |
| Silicone oil | 1 | 1 | 1 | 1 |
| Viscosity (poises/25° C.) of the mixture | | | | |
| Component (A) | 190 | 290 | 405 | 207 |
| Component (B) | 125 | 185 | 420 | 113 |
| Number of acid anhydride groups per epoxy group | 0.54 | 0.54 | 0.54 | 0.54 |
| Number of active hydrogens of the amino group per epoxy group | 0.86 | 0.86 | 0.86 | 0.86 |
| Properties | | | | |
| Storage stability (viscosity variations within 30% on storage for 1 week at 60° C.) | | | | |
| Component (A) | O | O | O | O |
| Component (B) | O | O | X | O |
| Shower resistance | Good | Good | Good | Half was flowed away. |
| Thickness of the cured film (microns) | 103 | 95 | 120 | 105 |
| Flexural strength (10mm $\phi$) | O | O | X | O |
| Adhesion (crosscut, 100/100) | O | O | X | O |
| Impact strength ($\frac{1}{2}$" × 500g × 20 cm) | O | O | X | O |
| Corrosion resistance (salt spray 1000 hours) | O | O | O | Rust formed (*2) |

(*2): Rust is seen to form in the boundary of the coated film.

It is seen from the results obtained that when the amount of the epoxy resin diluent or conductive carbon black is moderately varied (Runs Nos. 2-1 and 2—2), good properties can be obtained, but that when no diluent is added (Run No. 2-3), the storage stability of the mixture is impaired or a brittle cured product results, and when conductive carbon black is not added (Run No. 2-4), shower resistance is somewhat inferior because of poor thixotropic property, and the spreading of the electrodeposition paint at the edge portion to which the rust-preventive material was sprayed is poor and much rust forms.

EXAMPLE 3

The components (A) and (B) of Run No. 1-2 of Example 1 were sprayed onto a mild steel panel in a weight ratio of 1:0.5 (corresponding to 0.43 active hydrogen atom of the amino group per epoxy group) using two airless spray devices (both having a compression ratio of 1:50). Otherwise, the same procedure as in Example 1 was repeated. Good results were obtained in shower resistance, and the mechanical properties and corrosion resistance of the cured article.

COMPARATIVE EXAMPLE 1

Methyltetrahydrophthalic anhydride was removed from the formulation of component (A) in Run No. 1-2 of Example 1 to form component (A'). On the other hand, methyltetrahydrophthalic anhydride was added to component (B) of Run No. 1-2 of Example 1 to prepare a component (B'). The component (B') had unsatisfactory storage stability, and was difficult to put to practical use because of an abrupt rise in viscosity. When the components (A') and (B') were applied, the resulting coated film cured only insufficiently. Thus, it was soft and had poor corrosion resistance.

COMPARATIVE EXAMPLE 2

Dimethylbenzylamine was removed from the formulation of component (B) in Run No. 2—2 of Example 2 to form a component (B'). On the other hand, dimethylbenzylamine was added to component (A) of Run No. 2—2 of Example 2 to prepare a component (A'). When the component (A') was stored for 1 week at 60° C., its viscosity increased to five times its original viscosity, and the component (A') became non-sprayable.

EXAMPLE 4

In each run, a thermosetting material composed of components (A) and (B) was prepared by mixing an epoxy resin (a glycidyl ether of bisphenol A marketed under the tradename "Epikote 828" made by Shell Chemical Co.; epoxy equivalent 180, viscosity 13,000 centipoises at 25° C.), an isomerization product of a mixture in equal proportions of 4-methyltetrahydrophthalic anhydride and 3-methyltetrahydrophthalic anhydride (freezing point below −20° C.), polyamideamine ("Versamid 140", a trademark for a product of Daiichi General Co., Ltd.; amine value 38.5, viscosity 350 centipoises at 75° C.), tin octenate, a non-reactive epoxy resin diluent ("Sintaron 200", a trademark for a phenol-modified aromatic polymer made by Tokyo Resin Industry Co., Ltd.; viscosity 200 centipoises at 25° C., number average molecular weight 370), carbon black ("Ketjen Black", a trademark for a product of Lion-Akzo Company), talc, and a silicone oil ("SH-28PA", a trademark for a product of Toray Silicone Co., Ltd.) in accordance with the recipes shown in Table 3. At this time, the mixture was dispersed by a three-roll mill. The particle diameters of the resulting dispersed particles, determined by an electron microscope, were 1 to 20 microns.

The viscosities of the resulting components (A) and (B) at 25° and 50° C. were measured by a B-type viscometer. Then, the components (A) and (B) were introduced in a weight ratio of 1:1 into a gun of the internal mixing type (the distance from a point at which the components from two hoses got together to the tip at which the mixture was sprayed was 2 cm) using two airless spray devices (both having a compression ratio of 1:50), and sprayed against a mild steel panel having an anti-rust oil adhering thereto. The panel was allowed to stand at room temperature for 3 hours. Then, warm water at 60° C. was sprayed in atomized form under a pressure of 5 kg/cm², and the shower resistance of the coated steel panel was observed. Then, electrodeposition coating was performed on the steel panel in the same way as in Example 1, and the properties of the coated film were evaluated. The results are shown in Table 3.

TABLE 3

| Run No. | Invention | | | |
|---|---|---|---|---|
| | 4-1 | 4-2 | 4-3 | 4-3 |
| Component (A) | | | | |
| Epoxy resin | 100 | 100 | 100 | 100 |
| Methyltetrahydrophthalic anhydride | 60 | 60 | 60 | 70 |
| Diluent | 60 | 30 | 60 | 50 |
| Carbon black | 2 | — | 2 | 2 |
| Talc | 50 | 25 | 50 | 50 |
| Silicone oil | 1 | 1 | 1 | 1 |
| Component (B) | | | | |
| Polyamideamine | 40 | 40 | 40 | 60 |
| Tin octenate | 3 | 3 | 3 | 3 |
| Diluent | 150 | 150 | 150 | 130 |
| Carbon black | 1 | 6 | 4 | 4 |
| Graphite | 5 | 5 | 5 | 5 |
| Silicone oil | 1 | 1 | 1 | 1 |
| Viscosity of the mixture (poises/25° C., 10 revolutions) | | | | |
| Component (A) | 212 | 156 | 212 | 184 |
| Component (B) | 258 | 430 | 350 | 373 |
| Thixotropy index | | | | |
| Component (A) | 3.1 | 1.3 | 3.1 | 3.0 |
| Component (B) | 1.4 | 2.8 | 2.3 | 2.4 |
| Number of acid anhydride groups per epoxy group | 0.65 | 0.65 | 0.65 | 0.76 |
| Number of active hydrogens of the amino group per epoxy group | 1.18 | 1.18 | 1.18 | 1.73 |
| Properties | | | | |
| Storage stability (viscosity variations within 30% on storage for 1 week at 60° C.) | | | | |
| Component (A) | O | O | O | O |
| Component (B) | O | O | O | O |
| Shower resistance | Half was flowed. | Half was flowed. | Good | Good |
| Thickness of the cured film (microns) | 135 | 165 | 155 | 140 |
| Flexural strength (10mm φ) | O | O | O | O |
| Adhesion (crosscut) | O | O | O | O |
| Impact strength (½" × 500g × 20 cm) | O | O | O | O |
| Corrosion resistance (salt spray 1500 hours)* | Rust formed (*1) | Rust formed (*1) | O | O |

In this Example, the conditions for the evaluation of shower resistance and corrosion resistance were more rigorous than those employed in Example 1. When the thixotropy indices of components (A) and (B) are more than 2 (Runs Nos. 4-3 and 4—4), good properties are obtained under these rigorous evaluating conditions. However, when the thixotropy index of component (A) or (B) is less than 2 (Runs Nos. 4-1 and 4-2), shower resistance and corrosion resistance are unsatisfactory in spite of the fact that good properties were obtained under the evaluating conditions used in Example 1.

EXAMPLE 5

Components (A) and (B) were prepared in accordance with the recipes shown in Table 4. Otherwise, Example 4 was repeated. The results are shown in Table 4.

TABLE 4

| Run No. | Invention | | | |
|---|---|---|---|---|
| | 5-1 | 5-2 | 5-3 | 5-4 |
| Component (A) | | | | |
| Epoxy resin | 100 | 100 | 100 | 100 |
| Methyltetrahydrophthalic anhydride | 60 | 60 | 60 | 60 |
| Diluent | 70 | 70 | 100 | 60 |
| Carbon black | 0.5 | 6 | 3 | 5 |
| Talc | 30 | 40 | 60 | 40 |
| Silicone oil | 1 | 1 | 1 | 1 |
| Component (B) | | | | |
| Polyamideamine | 60 | 60 | 60 | 60 |
| Dimethylbenzylamine | 1 | 1 | 1 | 1 |
| Diluent | 150 | 160 | 190 | 150 |

TABLE 4-continued

| Run No. | Invention | | | |
| --- | --- | --- | --- | --- |
| | 5-1 | 5-2 | 5-3 | 5-4 |
| Carbon black | 5 | — | 3 | 5 |
| Talc | 50 | 40 | 70 | 50 |
| Silicone oil | 1 | 1 | 1 | 1 |
| Viscosity of the mixture (poises at 25° C., 10 revolutions) | | | | |
| Component (A) | 205 | 480 | 312 | 340 |
| Component (B) | 185 | 125 | 140 | 185 |
| Thixotropy index | | | | |
| Component (A) | 1.8 | 3.1 | 2.6 | 2.9 |
| Component (B) | 2.5 | 1.4 | 2.2 | 2.5 |
| Number of acid anhydride groups per epoxy group | 0.65 | 0.65 | 0.65 | 0.65 |
| Number of active hydrogens of the amino group per epoxy group | 1.73 | 1.73 | 1.73 | 1.73 |
| Properties | | | | |
| Storage stability (viscosity variations within 30% on storage at 60° C. for 1 week) | | | | |
| Component (A) | O | O | O | O |
| Component (B) | O | O | O | O |
| Shower resistance | Half was flowed away. | Partly flowed away. | Good | Good |
| Thickness of the cured coated film (μ) | 180 | 155 | 175 | 190 |
| Flexural strength (10mm φ) | O | O | O | O |
| Adhesion strength (crosscut) | O | O | O | O |
| Impact strength (½" × 500g × 20 cm) | O | O | O | O |
| Corrosion resistance (salt spray 1000 hours) | Rust formed. (*1) | Rust formed. (*1) | O | O |

It is seen from Table 4 that when the type of the curing agent used as one ingredient of component (B) is changed, similar results to those obtained in Example 4 are obtained. In Runs Nos. 5-1 and 5-2 in which the thixotropy indices of the components (A) and (B) are less than 2, good properties are obtained under the evaluating conditions used in Example 1.

EXAMPLE 6

The components (A) and (B) of Run No. 4-3 of Example 4 were sprayed in a weight ratio of 1:0.5 (corresponding to 0.59 active hydrogen of the amino group per epoxy group) onto a mild steel panel. Otherwise, the same procedure as in Example 4 was repeated. Good results were obtained in shower resistance, and the mechanical properties and corrosion resistance of the cured article.

What we claim is:

1. A two-package rust preventive material which is free of volatile solvents, consisting essentially of (A) a sprayable component containing a liquid epoxy resin and a liquid polycarboxylic acid anhydride and (B) a sprayable component containing a liquid primary or secondary amino compound and a curing accelerator, at least one of said components (A) and (B) containing a diluent which is not reactive with epoxy resin compositions having a molecular weight of 300 to 4,000 and an electrically conductive powder.

2. The material of claim 1 wherein both the components (A) and (B) have a thixotropy index of at least 2.0.

3. The material of claim 1 which is for use in automobiles.

4. The material of claim 1 wherein the components (A) and (B) have a viscosity of 1 to 1,000 poises at 25° C.

5. The material of claim 1 wherein the amount of the epoxy resin diluent present in the mixture of components (A) and (B) is from 10 to 250 parts by weight and the amount of 0.5 to 20 parts by weight.

6. The material of claim 1 wherein the resulting mixture contains 0.2 to 1.5 acid anhydride groups and 0.1 to 2.5 active hydrogens of the amino group per epoxy group, and the total number of the acid anhydride groups and active hydrogens of the amino group is at least 0.6.

7. The material of claim 1 wherein in component (A), the ratio of polycarboxylic acid anhydride to epoxy resin is from 0.2 to 1.5 per epoxy group.

8. The material of claim 1 wherein in component (B) the amount of the primary or secondary amino compound used is from 0.1 to 2.5 active hydrogens in the amino group per epoxy group and the amount of curing accelerator used is from 0.05 to 30 parts by weight per 100 parts by weight of the epoxy resin.

9. The material of claim 1 wherein the liquid epoxy resin in component (A) has at least two epoxy groups per molecule.

10. The material of claim 1 wherein the polycarboxylic acid anhydride in component (A) has a freezing point of not more than 0° C.

* * * * *

UNITED STATES PATENT AND TRADEMARK OFFICE
CERTIFICATE OF CORRECTION

PATENT NO. : 4,324,713
DATED : April 13, 1982
INVENTOR(S) : Kita et al.

It is certified that error appears in the above—identified patent and that said Letters Patent is hereby corrected as shown below:

Page 1, item [73], the name of the second assignee company should be "Nissan Motor Co., Ltd." instead of "Nisson Motor Co., Ltd."

Signed and Sealed this

Seventh Day of September 1982

[SEAL]

Attest:

Attesting Officer

GERALD J. MOSSINGHOFF

Commissioner of Patents and Trademarks